United States Patent
Hagan

(10) Patent No.: US 9,857,255 B2
(45) Date of Patent: Jan. 2, 2018

(54) TRACTION-BATTERY VEHICLE TEST TRAILER

(71) Applicant: FORD GLOBAL TECHNOLOGIES, LLC, Dearborn, MI (US)

(72) Inventor: Daniel Lee Hagan, Oakland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 434 days.

(21) Appl. No.: 14/160,626

(22) Filed: Jan. 22, 2014

(65) Prior Publication Data
US 2015/0204741 A1 Jul. 23, 2015

(51) Int. Cl.
| | | |
|---|---|---|
| *B60K 1/04* | (2006.01) | |
| *B60L 9/00* | (2006.01) | |
| *G01L 5/13* | (2006.01) | |
| *B60L 11/18* | (2006.01) | |
| *B62D 59/04* | (2006.01) | |
| *B60K 6/20* | (2007.10) | |
| *B60W 10/08* | (2006.01) | |
| *B60L 7/14* | (2006.01) | |

(52) U.S. Cl.
CPC ............. *G01L 5/136* (2013.01); *B60K 6/20* (2013.01); *B60L 7/14* (2013.01); *B60L 11/1803* (2013.01); *B60L 11/1809* (2013.01); *B60L 11/1816* (2013.01); *B60L 11/1868* (2013.01); *B60L 11/1877* (2013.01); *B60W 10/08* (2013.01); *B62D 59/04* (2013.01); *B60K 2001/0444* (2013.01); *B60L 2200/28* (2013.01); *B60W 2300/14* (2013.01); *B60W 2530/22* (2013.01); *B60Y 2200/147* (2013.01); *B60Y 2200/91* (2013.01); *B60Y 2300/28* (2013.01); *Y02T 10/7005* (2013.01); *Y02T 10/7066* (2013.01); *Y02T 10/7072* (2013.01); *Y02T 90/14* (2013.01); *Y10S 903/903* (2013.01)

(58) Field of Classification Search
CPC ..... B60W 20/00; Y02T 10/6217; B60L 11/23; B60L 11/1861; B60L 220/28; B60L 11/1801; B60L 2200/28; B60L 11/1877; B60K 2001/0444; G01L 5/221
USPC ................ 180/2.1, 14.1–14.4, 14.6, 11, 15
See application file for complete search history.

(56) References Cited

U.S. PATENT DOCUMENTS

| | | | | |
|---|---|---|---|---|
| 4,771,838 | A * | 9/1988 | Ketcham | 180/6.62 |
| 5,450,748 | A | 9/1995 | Evans et al. | |
| 5,559,420 | A | 9/1996 | Kohchi | |
| 6,281,646 | B1 * | 8/2001 | Masberg et al. | 318/139 |
| 6,419,037 | B1 * | 7/2002 | Kramer et al. | 180/14.2 |
| 6,691,013 | B1 * | 2/2004 | Brown | 701/70 |
| 7,325,638 | B1 * | 2/2008 | Belloso | B60K 5/08 |
| | | | | 180/14.2 |
| 8,141,667 | B2 * | 3/2012 | Shepard et al. | 180/14.1 |

(Continued)

*Primary Examiner* — Anne Marie Boehler
(74) *Attorney, Agent, or Firm* — David B. Kelley; Brooks Kushman P.C.

(57) ABSTRACT

A trailer for a vehicle with a high voltage traction-battery. The trailer may be a self-propelled trailer to substantially match vehicle dynamics and minimize impact on the vehicle. Alternatively, the trailer may push the vehicle to simulate hill descent, or drag on the vehicle to simulate hill ascent. The trailer may provide power for the vehicle. The trailer may provide current to a vehicle electric machine. The trailer may also provide current to recharge a vehicle traction-battery. The trailer may also recharge its own traction-battery.

13 Claims, 1 Drawing Sheet

(56) References Cited

U.S. PATENT DOCUMENTS

| | | | |
|---|---|---|---|
| 8,214,108 B2* | 7/2012 | Post et al. | 701/48 |
| 8,627,908 B2* | 1/2014 | Wellborn | B62D 59/04 |
| | | | 180/14.2 |
| 8,863,866 B2* | 10/2014 | Pfister | 180/14.2 |
| 8,991,528 B2* | 3/2015 | Hellholm et al. | 180/14.2 |
| 2006/0076836 A1* | 4/2006 | Plishner | B60K 6/46 |
| | | | 307/66 |
| 2010/0065344 A1* | 3/2010 | Collings, III | 180/2.1 |
| 2010/0065348 A1* | 3/2010 | Arad | 180/11 |
| 2012/0061154 A1 | 3/2012 | Pfister | |
| 2012/0245796 A1* | 9/2012 | Yu et al. | 701/41 |

* cited by examiner

TRACTION-BATTERY VEHICLE TEST TRAILER

TECHNICAL FIELD

This disclosure relates to testing trailers for vehicles having high voltage traction-batteries, and more specifically to self-propelled trailers that may substantially match vehicle dynamics to minimize impact on the vehicle during testing, push the vehicle to simulate hill descent, drag on the vehicle to simulate hill ascent, provide energy for the vehicle, and recharge the vehicle traction-battery as well as its own traction-battery, alone, or in any combination of the above.

BACKGROUND

Vehicular manufacturers often test vehicles to ensure that the vehicle's pass a certain level of durability and quality over the designed life of the vehicle. Since the designed life of modern vehicles may exceed decades of time and high mileages, the testing is often accelerated and compressed to provide useful results in a shorter period of time. These tests may vary in elapsed time, distance traveled, and may be run on unique surfaces or at special venues. One way to test high mileage durability is to continuously drive a vehicle on a large oval at a proving grounds facility.

For testing timelines to remain on track, it is also important that the vehicle be in test-ready condition as much as possible. Previous vehicles that ran only on fuel could simply "gas and go" during the testing to remain on the track. Vehicles that have a motor require that a traction-battery be recharged before returning to the track. Recharging of a traction-battery may require a specified voltage and rate of recharge, and during this time the vehicle may not be in test-ready condition.

SUMMARY

One aspect of this disclosure is directed to a trailer for a vehicle having a traction-battery. The trailer may connected to the vehicle and used during testing of the vehicle, and as such it may be important that the trailer remain as invisible to the test as possible so that the trailer does not have an impact on the results of the test. The trailer may be used to carry a testing apparatus, used to maintain a charge on a traction-battery, provide simulated driving conditions on the vehicle, or provide a platform for a number of other testing options. In this aspect, an engine and electric machine are disposed on a rolling frame. The engine and electric machine are configured to, in combination or alone, provide propulsion for the frame. A controller is programmed to, in response to an indication of vehicle dynamics, operate the engine and/or electric machine to propel the frame to substantially match the vehicle dynamics. Vehicle dynamics may include speed, acceleration, and deceleration, among other things.

The trailer may have a force transducer disposed on a tongue of the trailer. The force transducer may measure forces exerted on the frame by the vehicle. These measured forces may provide an indication of the vehicle dynamics. If the vehicle is accelerating, the force load on the tongue will increase in a direction toward the vehicle (the force transducer will be in tension). If the vehicle is decelerating, the force load on the tongue will increase in a direction away from the vehicle (the force transducer will be in compression). The controller may be programmed to receive the force transducer signals and operate the engine and/or electric machine and/or hydraulic friction brakes to then propel or retard the frame and thereby create drive forces measured by the force transducer toward zero. If the forces on the force transducer are zero, then the trailer is matching the dynamics of the pulling vehicle.

The controller of the trailer may also be capable of communicating with a vehicle communication system. The controller may access the vehicle communication system, such as a CAN BUS, to determine the speed of the vehicle and/or the rate of change of the speed of the vehicle (acceleration). The speed data obtained from the vehicle communication system may provide the indication of vehicle dynamics. The data thus obtained may increase the controller's ability to anticipate and respond. The controller may be programmed to operate the engine and/or electric machine to propel the frame to a speed which substantially matches the vehicle speed.

The trailer may also have a friction braking system, and the controller may be further programmed to, in response to an indication of the vehicle dynamics, operate the friction braking, in combination with the engine and/or electric machine, or alone, to decelerate the frame to substantially match the vehicle dynamics.

In further embodiments, the controller of the trailer may be further programmed to operate the engine and/or electric machine to push the vehicle to simulate a hill descent condition on the vehicle, or to exert a drag force on the vehicle to simulate a hill ascent on the vehicle. In the case where the electric machine is used to drag the vehicle, the trailer may capture energy through a regenerative braking process or a combination of friction and regenerative braking.

The trailer may also have a trailer traction-battery and the controller may also be programmed to, in response to a specified input, switch the vehicle power supply from the on-board vehicle traction-battery to the trailer traction-battery. The specified input may be a control switch activated by a user or a predetermined traction-battery charge level. The control switch may be provided by a in-vehicle control box. The in-vehicle control box may be hard wired to the controller on the trailer (directly or through a vehicle internal communication network), or in wireless communication with the controller. The trailer may then be used to provide electric current to charge the vehicle traction-battery and therefore provide a household-like charging experience for the vehicle traction-battery.

Another aspect of this disclosure is directed toward a recharging trailer for a vehicle traction-battery. In this aspect, an engine, electric machine, and trailer traction-battery are disposed on the trailer, each capable of providing power to a traction-battery charger or charging system. A controller is programmed to, in response to the vehicle traction-battery having a low charge, switch the power supply for the vehicle to the trailer traction-battery, and at the same time utilize the trailer based charging system to recharge the vehicle traction-battery. The controller may then also be programmed to, in response to the vehicle traction-battery achieving a predetermined charge level (a recharged level/a full charge), switch the power supply for the vehicle back to the vehicle traction-battery, and utilize the charging system to recharge to trailer traction-battery.

This recharging trailer may also have a force transducer disposed on the trailer configured to measure forces applied to the trailer by being connected to a vehicle. The controller may be further programmed to utilize the engine or electric machine to propel the trailer and drive the forces measured by the force transducer to zero such that the trailer has minimal responsive forces applied to the vehicle. Alternatively, the controller may be programmed to utilize the electric machine to provide a regenerative braking force on the trailer to provide a predetermined tension force away from the vehicle (as measured by the force transducer) to simulate a hill ascent on the vehicle. The energy recovered by the regenerative braking may then be utilized to provide power to the charging system.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
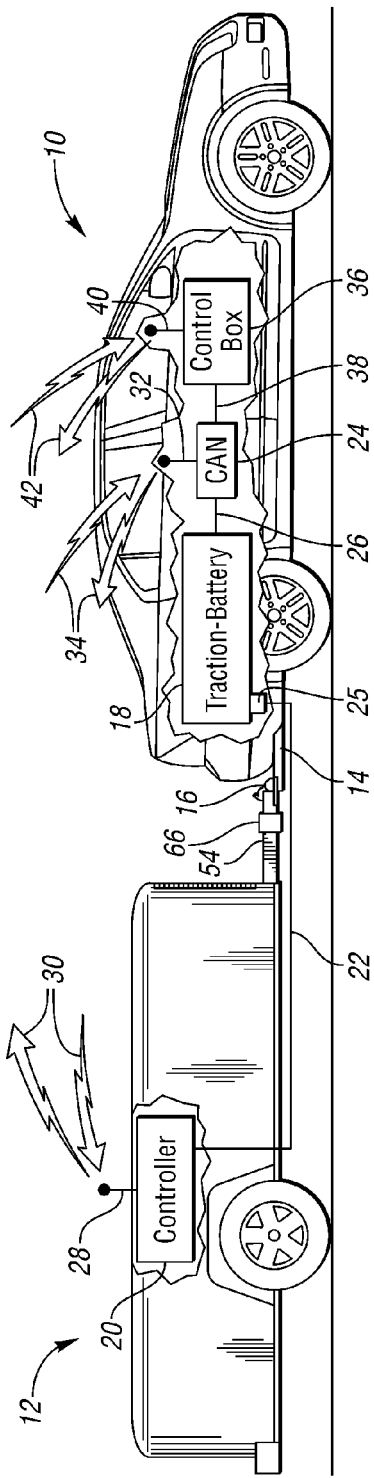
FIG. 1 is a diagrammatic view of a testing trailer connected to a vehicle with a traction-battery.

FIG. 1 shows a vehicle 10 connected to a trailer 12 via a hitch 14 and hitch coupler 16. Trailer 12 may also be referred to as test trailer 12 or recharging trailer 12. The vehicle 10 has a vehicle traction-battery 18 connected to a controller 20 on the trailer 12 via an electrical connection cable 22. The cable 22 has an electrical coupler 25 which allows the cable to connect to the traction-battery.

The electrical coupler 25 may be a T-coupler 25 that connects in-line with the existing vehicle electric system. The T-coupler 25 may have a switch in a first position that provides for electrical current flow from the vehicle traction-battery 18 to the vehicle 10 (as it normally would before the connection). The T-coupler 25 may be switched to a second position that cuts-off electric current flow from the vehicle traction-battery 18 to the vehicle 10 (to the electric machine of the vehicle) and replaces it with an electrical current flow from the trailer 12 to the vehicle 10. The T-coupler 25 may also provide for a separate electrical current flow from the trailer 12 to the vehicle traction-battery 18 simultaneous to the electric current flow being used to power the vehicle 10. The separate electrical flow may allow for the power supply to the vehicle 10 to be transferred from the vehicle traction-battery 18 to the trailer 12, while simultaneously allowing the trailer 12 to charge the vehicle traction-battery 18 through the single T-couple 25 connection. The trailer 12 may also provide an outlet (not shown) which may be connected to the vehicle's existing charge cable (not shown).

The controller 20 may be a power distribution device (as indicated here) or a power distribution device may be located separately from the controller 20. The controller 20 may be programmed to recognize when a vehicle traction-battery 18 has low charge (a predetermined charge level) and automatically switch power supply for the vehicle 10 over to the trailer 12. The controller 20 may obtain vehicle traction-battery 18 charge level directly from the vehicle traction-battery 18 through the T-coupler 25 and electrical connection cable 22, or via communication with a vehicle internal communication network 24.

A vehicle internal communication network 24 interconnects electronic systems within the vehicle 10. The network 24 may have certain protocols that are followed such as a Controller Area Network (CAN) or a Local Interconnect Network (LIN). Special requirements for vehicle control may be included in the network 24 such as assurance of message delivery, assured non-conflicting messages, assured time of delivery, EMF noise resilience, and the elimination of redundant routing.

The controller 20 may be in communication with the network 24 via a hard connection, as indicated by line 26, which is routed back through the electrical connection cable 22. The controller 20 may also include a trailer transceiver 28 for sending and receiving signals, as indicated by arrows 30. The vehicle 10 may also have a vehicle transceiver or transmitter 32 in communication with the network 24, which may also receive and/or transmit information as indicated by arrows 34. A portable transceiver or transmitter 32 may be plugged into an On-Board Diagnostics (OBD) connector (not shown) that has access to the network 24, if the vehicle 10 is not already equipped.

A control box 36 may be placed within the vehicle 10, and similarly may be in communication with the network 24 via a hard line connection as indicated by line 38, or have a control box transceiver 40 which may be in communication with the network 24 and/or the trailer 12, as indicated by arrows 42. The control box 36 may also be plugged into the OBD connector. When the control box 36 is plugged into the OBD connector, the control box transceiver 40 may function as the vehicle transceiver 32. The in-vehicle control box 36 may be in communication with the controller 20 to provide a user interface for an operator to provide user input to the controller 20.

Figure 2:
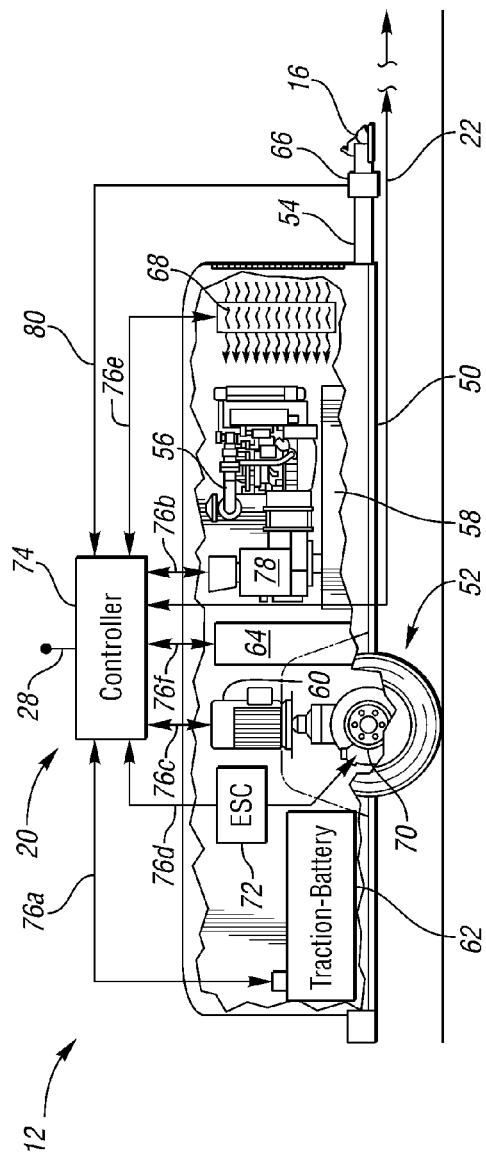
FIG. 2 is a diagrammatic view of a self-propelled recharging trailer.

FIG. 2 shows an embodiment of a self-propelled recharging trailer 12. Trailer 12 is shown here having a rolling frame 50 supported by an axle and wheels combination 52. The trailer 12 is shown as a single-axle trailer, however multiple axles may be used. The trailer 12 is also shown with a tongue 54 extending from the frame 50 with a hitch coupler 16 disposed on an end of the tongue 54 for connecting the trailer 12 to the vehicle 10. The trailer weight may be balanceable over the axle and wheels combination 52 to provide between zero and 100 pounds of vertical tongue weight on a hitch 14 (see FIG. 1) of the vehicle 10.

The trailer 12 may also have an engine 56, a fuel tank 58, an electric machine 60, and a trailer traction-battery 62 disposed on the frame 50. The engine 56, electric machine 60, and trailer traction-battery 62 are each capable of providing power to a vehicle 10 to either function as the power supply of the vehicle 10 or to recharge the vehicle traction-battery 18. A traction-battery charger or recharging system 64 may be disposed on the trailer 12 to provide the charge to the vehicle traction-battery 18 or to the trailer traction-battery 62. The engine 56 and electric machine 60 may be referred to as a powertrain for the trailer 12. The powertrain may be considered to include the trailer traction-battery 62 as well.

The controller 20 may be programmed to, in response to the vehicle traction-battery 18 having a low charge or a user specified input, switch the power supply for the vehicle 10 from the vehicle traction-battery 18 to the trailer traction-battery 62. The controller 20 may be programmed to utilize the charging system 64 to recharge the vehicle traction-battery 18. The charging system 64 may simulate a household charge, so that the vehicle traction-battery 18 charges at a similar voltage and rate as if plugged into a wall outlet. The charging system 64 may provide a seperate outlet (not shown) providing a United States mains electricity charge of an alternating current of substantially 120 volts and 60 Hertz in which the vehicle charge cord (not shown) may be attached thereto. Substantially, as used here, means within typical fluctuations of voltage and frequency as found in typical United States mains electricity charge lines and outlets. The energy used by the charging system 64 may come from the engine 56 and/or electric machine 60. The energy used by the charging system 64 may also come from the trailer traction-battery 62.

The controller may also be programmed to, in response to the vehicle traction-battery 18 reaching a predetermined upper charge level, such as being fully charged, switch the power supply for the vehicle 10 back to the vehicle traction-battery 18. The programming of the controller 20 may then utilize the charging system 64 to recharge to trailer traction-battery 62. The trailer traction-battery 62 may also be charged at a simulated household charge, or it may be charged directly by other systems on the trailer 12. The stopping of the vehicle traction-battery 18 charge may also be provided by the user through the control box 36.

The engine 56 and electric machine 60 may be configured to, in combination or alone, provide motive power for the trailer 12. The movement of the trailer 12 may be such that the trailer 12 substantially matches the vehicle dynamics, or speed, of the vehicle 10 to which it is attached so that the trailer does not provide much, if any, drag on the vehicle 10. Substantially, as used here, means that the rate of response of the trailer dynamics when compared to the vehicle dynamics is within 10%. This alone or combined with the minimal tongue weight placed on the hitch 14 of the vehicle 10 provides for the trailer being relatively invisible to the vehicle 10 and as such provides minimal influence to the testing on the vehicle.

The controller 20 may be capable of communication with the vehicle internal communication network 24 to obtain an indication of vehicle dynamics, and use this information to control the engine 56 and/or electric machine 60 to match the vehicle dynamics. The indication of vehicle dynamics may be vehicle speed. The controller 20 may have multiple modes of operation, which may be set by a user through the control box 36. The controller 20 may be programmed to operate the engine 56 and/or electric machine 60 to propel the frame to a speed which substantially matches the vehicle speed and minimizes longitudinal forces at the tongue.

The trailer 12 may also have a force gauge 66 disposed on the trailer 12 configured to measure forces applied to the trailer 12 by being connected to the vehicle 10. The force gauge 66 may be disposed on the tongue 54 such that the forces applied to the trailer 12 by the vehicle 10 may be measured. The force gauge 66 may be a tension/compression sensor or longitudinal sensor. As the vehicle 10 speeds up or slows down, the vehicle 10 will apply forces on the trailer. During vehicle acceleration, the force gauge 66 may be in tension and the trailer 12 may be propelled to remove the tension forces. During vehicle deceleration, the force gauge may be in compression and the trailer 12 may be slowed to reduce the compression forces. The controller 20 may be programmed to operate the engine 56 and/or electric machine 60 to maneuver the trailer 12 to drive the forces measured by the force gauge 66 toward a target value. The target value may be zero. As the measured forces at the force gauge 66 are driven toward zero, the trailer 12 will have minimal responsive forces applied to the vehicle 10.

The controller 20 may be programmed to utilize the electric machine 60 to assist in the retarding of the trailer 12. The electric machine 60 may provide a regenerative braking process to retard the trailer 12. The energy created through the regenerative braking process may be used to charge either the vehicle or trailer traction batteries 18, 62. The energy created through the regenerative braking process may also be directed by the controller 20 to a power absorption unit 68.

The controller 20 may be programmed to recognize any scenario in which additional power would be undesirable, and as such redirect the energy to the power absorption unit 68 to dissipate energy. This may be done in the case where both the vehicle and trailer traction-batteries 18, 62 are at or above a predetermined charge limit and further charging is not desired. The power absorption unit 68 may be air cooled. The power absorption unit 68 may be a resistance type absorption unit.

The trailer 12 may also have a friction braking system 70 to aid in the retarding of the trailer 12. The controller 20 may be programmed to, in response to an indication of vehicle dynamics, operate the friction braking system 70, in combination with the engine 56 and/or electric machine 60, or alone, to decelerate the trailer 12 to substantially match vehicle dynamics. The trailer may also have an electronic stability control (ESC) system 72 and the controller 20 may be capable of controlling the friction braking system 70 through the ESC system 72 to provide further stability for the trailer. The trailer 12 may be further equipped with additional sensors, such as a sway sensor (not shown), to provide stability information, and the controller may utilize the engine 56, electric machine 60, and/or friction braking system (with or without ESC), in any combination, to control and stabilize the trailer 12 during use.

The trailer 12 may also be used to push, pull or drag the vehicle 10 to simulate a hill descent or hill ascent. The controller 20 may be programmed to operate the engine 56 and/or electric machine 60 to provide a force in the direction of vehicle movement and push the vehicle to simulate a hill descent on the vehicle. In the case of the trailer 12 being attached to a rear portion of the vehicle 10, the controller 20 may be programmed to operate the engine 56 and/or electric machine 60 to drive the forces detected by the force transducer 66 toward a predetermined compression force. In this case, the target value would be greater than zero in a direction of vehicle movement and will provide a predetermined force on the vehicle 10 in a direction of the vehicle 10. A substantially constant compression force on the vehicle 10 will provide a propulsion of the vehicle 10 and may be metered in such a way as to simulate gravitational acceleration of a vehicle 10 down a hill.

The controller may be further programmed to utilize the engine 56, electric machine 60 (regenerative braking), and/or the friction braking system 70, in combination or alone, to provide forces on the vehicle opposite to vehicle movement to simulate a hill ascent. In the case of the trailer 12 being attached to a rear portion of the vehicle 10, the controller 20 may be programmed drag the trailer to drive the forces detected by the force transducer 66 toward a predetermined tension force. In this case, the target value would be greater than zero in a direction of opposite of vehicle movement and would provide a predetermined force on the vehicle 10 in a direction opposite to the direction the vehicle 10 is traveling. A substantially constant tension force on the vehicle 10 will provide a drag on the vehicle 10 and may be metered in such a way as to simulate gravitational deceleration of a vehicle 10 traveling up a hill. As above, the electric machine 60 may provide a regenerative braking force during this mode of operation and the energy recovered may be utilized to provide power to the charging system 64, the vehicle traction-battery 18, or the trailer traction-battery 62. The examples above are for a trailer 12 connected to the rear of a vehicle 10, however the trailer 12 may be attached to the front of a vehicle 10, in which case the forces applied to the vehicle may be swapped accordingly.

The controller 20 may be a power distribution center 74, and as such the controller may be in electrical communication with the components on the trailer 12 as indicated by arrow lines 76. Arrow lines 76 indicated both a physical connection with the controller 20, for power distribution, as well as communication with the controller 20, for control of the component. For example, line 76a between the controller 20 and the trailer traction-battery 62 indicates a control line for monitoring the trailer traction-battery charge level, as well as for moving electric current from the trailer traction-battery 62 to the vehicle 10 or for moving electric current toward the trailer traction-battery 62 when recharging. Line 76b indicates a control line for running the engine 56 to propel the trailer 12 and also for running the engine 56 to recharge a battery 18, 62. Line 76b then also indicates the moving of electric current generated by a generator 78 attached to the engine 56.

A clutch system (not shown) may be used to switch the engine 56 between driving an automatic transmission connected to the axle and wheels combination 52 to propel the trailer (also not shown) or the generator 78 to provide power. The controller 20 may be in communication with the clutch system and transmission and used to engage/disengage the clutch as well as shift the transmission, depending on the needs of the trailer at any given time.

Line 76c indicates both a control line between the controller 20 and the electric machine 60 and a mode for electric current to travel. In the case of using the electric machine 60 to drive the trailer, electric current will move from the controller 20 toward the electric machine 60. In the case of using the electric machine to harvest regenerative braking power, current may run from the electric machine 60 toward the controller 20. The electric machine 60 may also be connected to a transmission system and may also have a clutch system to disengage it from the same (also not shown).

Line 76d is merely a control line, and any current flowing through the line would only be what was needed to run the ESC system 72 or power a servo (not shown) to operate the friction braking system 70. Line 76e indicates where the controller may dump electric current toward the power absorption unit 68 to dissipate energy. Line 76f is between the charging system 64 and controller 20, and like above this line indicates control of the charging system as well as electrical current transfer.

Line 22 is a representation of the electrical connection cable 22 that runs between the trailer 12 and the vehicle 20 as indicated above. Line 80 is an indication of the communication between the force transducer 66 and the controller. Although all of these lines are shown disposed between the respective devices and the controller 20 as a central component, there may also be a matrix of other lines that connect devices directly without having to go through the controller 20. Also as mentioned above, the controller 20 may be a power distribution center 74, the controller 20 and power distribution center 74 may be two separate components.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A vehicle trailer comprising:
a rolling frame including a tongue;
a first traction battery configured to output a current to power an electric machine of a vehicle attached to the frame;
a powertrain including an engine and electric machine disposed on and configured to provide motive power for the frame; and
a controller programmed to
operate the powertrain to affect movement of the frame based on a force exerted on the tongue by the vehicle, and
in response to a charge level of a second traction battery located on the vehicle, output a signal to a controller on the vehicle to disable power flow between the second traction battery and the electric machine of the vehicle, and enable power flow between the first traction battery and the electric machine of the vehicle while driving the force toward a target value.

2. The trailer of claim 1 wherein the target value is zero.

3. The trailer of claim 1 wherein the target value is greater than zero in a direction of movement of the vehicle and wherein operating the powertrain to affect movement of the frame includes pushing or pulling the vehicle to simulate a hill descent.

4. The trailer of claim 3 further comprising a force gauge disposed on the tongue, wherein the tongue is attached to a rear portion of the vehicle and wherein the target value is a target compression value measured by the force gauge.

5. The trailer of claim 1 wherein the target value is greater than zero in a direction opposite of movement of the vehicle and wherein operating the powertrain to affect movement of the frame includes pushing or pulling the vehicle to simulate a hill ascent.

6. The trailer of claim 5 further comprising a force gauge disposed on the tongue, wherein the tongue is attached to a rear portion of the vehicle and wherein the target value is a target tension value as measured by the force gauge.

7. The trailer of claim 1 wherein operating the powertrain includes commanding the electric machine to provide regenerative braking to slow the frame.

8. The trailer of claim 1 further comprising a friction brake system, wherein the controller is further programmed to command the friction brake system to slow the frame.

9. The trailer of claim 1 wherein the powertrain is further configured to output a current to charge a traction-battery of the vehicle.

10. The trailer of claim 1 further comprising a control box in communication with the controller for providing a user interface to the controller, and the specified input is provided by a user.

11. The trailer of claim 1 further comprising a power absorption unit, wherein the controller is further programmed to direct power to the power absorption unit to dissipate energy in response to the first traction battery and the second traction battery exceeding a predetermined charge limit.

12. A vehicle trailer comprising:
a rolling frame attachable to a vehicle;

a powertrain disposed on the frame including an engine and electric machine configured to provide motive power for the frame and output a current to charge a traction-battery of the vehicle; and a controller configured to obtain data indicative of vehicle speed, and programmed to operate the powertrain to affect movement of the frame to substantially match the vehicle speed and charge the traction-battery;

wherein the powertrain further includes a traction-battery disposed on the frame and configured to output a current to power an electric machine of the vehicle; and wherein the trailer further includes a control box in communication with the controller and configured to provide a user interface to allow a user to command the controller to output a signal to a vehicle controller to disable power flow between a traction-battery and electric machine of the vehicle, and enable power flow between the traction-battery disposed on the frame and the electric machine of the vehicle.

13. A trailer comprising:

a frame tongue for attaching to a vehicle;

a trailer battery coupled to a vehicle motor;

a powertrain including an engine and a trailer motor; and a controller programmed to
- control the powertrain based on a force at the tongue, and
- based on a vehicle battery charge, signal a vehicle controller to disable power flow from the vehicle battery, and enable power flow between the trailer battery and the vehicle motor.

* * * * *